United States Patent Office 3,390,141
Patented June 25, 1968

3,390,141
COPOLYMERIZATION PROCESS
Harry F. Richards, Walnut Creek, Calif., assignor to Shell Oil Company, New York, N.Y., a corporation of Delaware
No Drawing. Filed Oct. 9, 1964, Ser. No. 402,945
4 Claims. (Cl. 260—88.2)

This invention relates to the production of thermoplastic linear polymers consisting predominantly of polymerized ethylene.

Polyethylenes are well-known commercial thermoplastic materials. They are broadly divided into two types. Low-density polyethylene is produced under high pressure by means of free-radical generating catalysts; high density polyethylene is produced under much lower pressure by contact with anionic catalysts of the Ziegler-type. Polyethylene produced with Ziegler-type catalyst is characterized not only by its higher density relative to high pressure polyethylene, but by improvement in properties which are associated with its substantially reduced degree of branching relative to high pressure polyethylene.

Copolymers of ethylene with alpha-alkenes are also known. Thermoplastic, nonrubbery random copolymers of ethylene with relatively small amounts of alpha-alkenes of from 3 to 18 carbon atoms, and particularly of propylene, have been shown to be uniquely useful in providing polymer-wax blends of outstanding physical characteristics. Such polymers are described, for example, in Belgian Patent 612,085 to Shell Internationale Research Maatschappij.

The first high density linear polyethylene, reported by Ziegler et al. in "Angew. Chem.," vol. 67, 424–426 (1955), was of very high molecular weight. Much of the process development of polyethylene has been devoted to modifying the original procedures to obtain polymers of lower molecular weight which would have flow properties that make them adaptable to conventional plastics-fabrication techniques. Another object of workers in this art has been to produce polyethylene of the highest possible linearity and density.

It is now known that the particular choice of concentration and species of catalysts, cocatalysts and solvents, and of reaction conditions such as monomer concentration and temperature, affects the nature of the resulting polymer. The molecular weight of polyethylene and similar polyolefins can accordingly be reduced by changing such variables or by adding various compounds which modify the action of the catalyst. Methods for producing polymer of relatively high density by control of reaction conditions or by addition of certain catalyst-modifying compounds have also been disclosed.

Various methods of controlling polymer molecular weight and density, and the advantages and disadvantages of such methods, are thus known to the workers skilled in production of polyolefins. Unfortunately, known methods of reducing molecular weight often result in polymer of decreased linearity and density, while known methods of increasing linearity and density lead to production of polymer of excessive molecular weight.

This invention now provides a method for producing polymers which have essentially the properties of polyethylene or of random copolymers of ethylene and another alpha-olefin, except that in the polymers or copolymers of this invention the molecular weight is sufficiently low so that the polymer is readily workable, while at the same time the linearity and density are unusually high.

It is one of the major objects of this invention to provide a new and improved method for producing modified polyethylene of controlled relatively low molecular weight and relatively high density and linearity.

Another major object of this invention is to provide a new and improved method for producing modified random copolymers of ethylene and propylene, or of ethylene and higher alpha-alkenes, said copolymers having a controlled relatively low molecular weight and relatively high density and linearity.

Another object is to provide novel methods for producing copolymers consisting of linear polyethylene with from 0.01 to 7 percent by weight of styrene and preferably from about 0.1 to 2 percent by weight, the styrene being present in chain-terminating position.

Another object is to provide novel methods for producing terpolymers consisting of linear random copolymers of ethylene and propylene or higher alpha-alkene with from 0.01 to 7 percent by weight of styrene and preferably from about 0.1 to 2 percent by weight, the styrene being present in chain-terminating position.

The terms "modified polyethylene" and "modified ethylene-propylene random copolymer" are employed herein to refer to said compositions which contain a small amount of styrene.

The objects of this invention are achieved by carrying out the polymerization of ethylene or of a mixture of ethylene and propylene or higher alpha-alkene in the presence of a controlled small amount of a vinyl-aromatic compound such as styrene by contact with a coordination-type polymerization catalyst.

It has been found, quite unexpectedly and surprisingly, that the presence of a small amount of styrene in such polymerizations results not only in a controlled reduction in molecular weight but also a substantial increase in the linearity, i.e., a reduction in branching, of the poly-alkene portion of the product.

The following remarks may provide a basis for an understanding of this observation. However, the invention is based on observed experimental facts and is not limited by any theory as to its chemical mechanism.

The following two separate and apparently independent effects are observed to occur when a feed containing ethylene, with or without another alpha-alkene, is polymerized in the presence of a small, controlled amount of styrene under the conditions of the process of this invention. The resulting polymer has a substantially lower molecular weight than polymer produced in the absence of styrene under otherwise identical conditions, and the resulting polymer has a higher density that a polymer of identical molecular weight produced under similar conditions with hydrogen as molecular weight reducing agent.

It was unexpected to find that styrene could be present in the polymer in concentrations up to several percent without a substantial decrease in polymer crystallinity. If styrene entered into polyalkene chains in random fashion, it should significantly reduce the polymethylene-type crystallinity of the polymer. It has been found, however, that under the conditions of this invention styrene does not enter into polyalkene chains as would an alpha-alkene compound. Styrene is found to occur in the resulting polymers only as a styrene molecule or block at the end of the polyalkene chains. These styrene terminations have been found not to cause an objectionable reduction in crystallinity of the polymer. It appears from the data that styrene molecules or polymer sections act to terminate the growth of polyalkene chains and thus to control the molecular weight of the polymer.

The observed increase in density is apparently due to a separate and different mechanism. It is known that in the conventional polymerization of ethylene with Ziegler-type catalysts the polymerization reaction mixture contains some low molecular weight ethylene addition products, mainly butene and hexene. These are included in random fashion in the polymer and cause some branchiness and consequently some reduction in polymer crystallinity and density over that which is theoretically possible in polyethylene. It appears that the use of styrene in accordance with this invention suppresses the addition of such higher alkenes in ethylene polymerization and hence produces a polymer of lower branchiness, and hence higher crystallinity and density. It is thought that this effect may be due to greater reactivity of styrene relative to butene and hexene.

The above observations are confirmed by infrared analysis of polymers, which shows reduction of branchiness, and by measurement of density of the polymers produced according to this invention.

In one preferred mode of practicing this invention the sole polymerizable alkene present in the feed is ethylene.

In a second preferred mode of practicing this invention the polymerizable alkene constituents of the feed are ethylene and proplyene in a ratio which is controlled to provide a polymerization product having an ethylene content in the range from about 80 to about 95 mole percent.

The process of this invention can also be practiced in the polymerization of feeds consisting of ethylene and propylene in ratios other than those just sepcified, i.e., ratios which result in a product having an ethylene content in the range from 40 to 80 mole percent.

A further mode of practicing this invention results in product that has useful properties but is not ordinarily commercially attractive. In that mode, the alkene components of feed to the polymerization reaction consist of ethylene and an alpha-alkene of from 4 to 20 carbon atoms per molecule, in a ratio selected such that the mole ratio of ethylene to higher alpha-alkene in the polymer is in the range from about 40 to about 95 mole percent and preferably from 80 to 95 mole percent.

The polymerization reaction is catalyzed by a catalyst of the type known as coordination catalyst or Ziegler-type catalyst. Such a catalyst consists, broadly, of a two-component system comprising a compound of the left hand subgroups of Groups IV–VI or Group VIII of the Mendeleeff Periodic Table, as illustrated on page 28 of Ephraim "Inorganic Chemistry," Sixth English Edition, and a Group I–III element or alloy or hydride or organic derivative having an organometallic bond.

For the polymerization of ethylene modified by addition of small amounts of styrene according to this invention, suitable catalysts include those ordinarily used for ethylene polymerization. Suitable catalysts can be selected, for example, from the references listed on pages 328–349 of "Linear and Steroregular Addition Polymers" by Gaylord and Mark, Interscience Publishers, Inc. New York, 1959.

Very useful ethylene polymerization catalysts are reaction products of titanium tetrachloride and a reducing organometallic compound. In such catalysts the average valence of titanium is between 3 and 4. Vanadium tetrachloride or zirconium tetrachloride may be substituted for titaniunm tetrachloride.

Typical catalysts employ as the transition metal compound in polymerization of ethylene, titanium tetrachloride, titanium trichloride, vanadium tetrachloride, or zirconium tetrachloride.

The mode of the invention in which ethylene and propylene or higher alpha-alkene are copolymerized in the presence of a small amount of styrene is preferably carried out in the presence of a soluble coordination-type catalyst of the kind which has been disclosed to be suitable for copolymerization reactions. Generally suitable soluble transition metal compounds for use in such copolymerization are, for example, vanadium oxychloride, and organic compounds of transition metals, and preferably of vanadium, such as vanadium esters, vanadium tri-acetylacetonate, vanadyl acetylacetonate, trialkyl vanadates, and vanadium complexes resulting from the reaction of vanadyl salts with alkali metal salts of alkyl-substituted salicylic acids, the latter being specifically described, for example, in Ser. No. 179,221, filed Mar. 12, 1962. Trialkyl vanadates VO(OR)$_3$ suitably have alkyl groups of from 2 to 8 carbon atoms, and preferably branched groups of 3 to 4 carbon atoms. The soluble catalysts are also suitable for polymerization of ethylene with small amounts of styrene.

Preferred organometallic reducing compounds suitable for use in this invention are aluminum alkyl compounds including aluminum trialkyls, aluminum dialkyl monohalides, aluminum alkyl sesquihalides and aluminum monoalkyl dihalides as well as aluminum compounds of this type in which some of the alkyl groups are replaced by alkoxy groups. The alkyl groups generally are those having from 2 to 10 carbon atoms. The ethyl compounds are especially preferred. Typical aluminum alkyls for use in these catalysts are aluminum triethyl, aluminum tri-isobutyl, aluminum diethyl chloride, aluminum monoethyl dichloride, aluminum ethyl sesquichloride and other similar compounds.

The polymerization reaction is carried out in liquid phase in the presence of organic diluent liquid. Suitable diluents include aliphatic and cyclic hydrocarbon liquids, e.g., hexane, heptane, cyclohexane, benzene and toluene. The chemical nature of the diluent may exert some effect upon the polymerization reaction, at least in the copolymerization of ethylene with higher 1-alkenes. The effect may be due to relative differences in solubility of the various feed components in the particular diluent. Some adjustment in reaction conditions may therefore be required, depending upon the diluent used. For example, if a copolymer of a specific ethylene-to-propylene ratio is desired in the copolymerization of ethylene and propylene, a higher ethylene-to-propylene gas ratio in the feed is necessary in the presence of an aliphatic or cycloaliphatic diluent as compared to an aromatic one. The preferred diluent for carrying out the copolymerization of ethylene and propylene is cyclohexane.

The polymerization reaction can be carried out at a temperature in the range normally employed for polymerization of ethylene, i.e., from 10° to 100° C. The tempertaure affects yield and polymer properties to some extent, particularly in copolymerization. In general, an increase in temperature decreases the catalyst life and hence yield and also polymer molecular weight. However, the solubility of copolymers which have a relatively high molecular weight and high ethylene content increases with temperature while the viscosity of the reaction mixture decreases with temperature. This permits production of solutions of higher polymer content at relatively higher temperatures. Polymerization of ethylene according to this invention is preferably carried out in the range of 20° to 60° C. and copolymerizations of ethylene with propylene in the range from 40° to 60° C.

Since the rate of reaction is governed by monomer availability, an increase in gas pressure results in an increased rate of polymerization and causes the production of polymers of higher molecular weight, other conditions being equal. However, practical rates of conversion are obtained at pressures as low as 15 p.s.i.g.; in general, the reaction may be carried out at any pressure in the range normally employed for ethylene polymerization or ethylene-propylene copolymerization, i.e., in the range from 0 to 500 p.s.i.g. and preferably from 30 to 150 p.s.i.g.

The ratio of ethylene to higher 1-alkene in the copolymerization reaction is controlled to produce a copolymer having ethylene and higher 1-alkene present in the desired ratio, usually between 80 and 95 mole percent. The importance of monomer reactivity ratios in determining the composition of the resulting copolymer has been described in the literature. The reactivity ratios of ethylene and propylene or other 1-alkene vary with different catalysts and conditions. For example, for the catalyst system of tri-sec-butyl vanadate and ethyl aluminum sesquichloride the reactivity ratios of ethylene and propylene are 15.1 and 0.05. Therefore, ethylene enters the growing chain about 300 times faster than propylene.

However, it is the ethylene-to-propylene ratio in the liquid phase that is most critical in determining the mole percent of ethylene in the resulting polymer. With cyclohexane solvent, for example, because of the higher solubility of propylene, the ethylene-to-propylene ratio in solution is typically 56/44 when the ratio of ethylene-to-propylene in the feed gas is 70/30. Under these conditions and using the above-mentioned catalyst a copolymer of 90% ethylene and 10% propylene is obtained. Raising the reaction temperature requires a corresponding increase in ethylene concentration to maintain constant polymer composition. These considerations in the production of ethylene-propylene copolymer of desired ratio are well-known. For any particular selection of catalyst, solvent and reaction conditions the required ratio of ethylene-to-propylene in the feed and in the solution are readily determined by routine tests.

The process of this invention is carried out in semicontinuous or continuous manner. In the former method, the feed and catalyst components are continually added to a reaction mixture in which polymer is permitted to accumulate during each run, to be recovered at the end of the run. In the latter method a portion of the reaction mixture is continually withdrawn as well, and polymer removed from it and recovered as product.

The rate of addition of transition metal compound is controlled to maintain an effective catalyst concentration in the reaction mixture. Suitable average addition rates are in the range from $5 \times 10^{-4}$ to $1 \times 10^{-1}$ millimoles of transition metal compound per minute per liter of reaction mixture. The reducing organometallic compound may be added in combination with the transition metal compound, but is conveniently added as a separate stream. Suitable proportions of reducing organometallic compound to transition metal compound are well known. The molar ratio of aluminum or similar metal to transition metal should be at least 3:1 and is conveniently in the range from 3:1 to 10:1, but may be as high as 100:1 or greater.

The addition of styrene in accordance with this invention is preferably carried out continuously such as to maintain an essentially constant molar ratio of styrene to transition metal in the catalyst. The average molar ratio of styrene to transition metal should generally be maintained in the range from 0.1:1 to 100:1 and preferably in the range from 2:1 to 40:1. The styrene concentration in solution is generally held in the range from 0.001 molar to 0.2 molar.

The results of polymerizations carried out in accordance with this invention are affected by interdependent effects of several variables; the skilled operator will be able to determine a proper balance of conditions for each desired reaction system.

Representative of the interrelated effects are styrene-to-catalyst ratios. Increasing either the styrene or the catalyst concentration in the reaction mixture has the effect of reducing the molecular weight of the product; decreasing either the styrene or the catalyst concentration causes an increase in polymer molecular weight. However, styrene and catalyst concentration have opposite effects on the reaction rate. Whereas increased catalyst concentration increases the rate, and can lead to runaway reaction, an increase in styrene concentration reduces the rate somewhat. To cause a desired change in polymer molecular weight in a system operating at steady state conditions both the catalyst and styrene concentration should be changed in the same direction. This accomplishes the desired change in molecular weight of the product while maintaining a relatively steady reaction rate.

Styrene may be added to the reactor as a separate stream. It is generally preferable to add the styrene in solution in inert diluent in order to provide for better control of addition of the required relatively small amounts and for better distribution in the reactor. The styrene may also be added as a component of a monomer feed stream or of a catalyst component stream. However, it should not be added together with the combined catalyst ingredients, since it could then undergo homopolymerization.

While styrene is generally preferred for use in this invention, i.e., because it is readily available and relatively inexpensive, similar beneficial effects may also be obtained by use of other vinyl aromatic compounds, such as alpha-methylstyrene, styrene having nuclear alkyl substituents, e.g., vinyl toluenes, vinyl xylenes, or vinyl ethyl benzenes, or halo-substituted styrene such as monochloro styrene.

ILLUSTRATIVE EXAMPLES

In the following examples and throughout this specification, the following conventions are employed unless otherwise specified.

Parts and percentages are by weight.

Intrinsic viscosities are determined from measurements in Decalin at 150° C.

Tensile properties are determined according to ASTM procedures on D-die specimens of about 65–75 mil thickness using an Instron Tester with a cross-head separation rate of 2 inches per minute.

Example 1

In the process of this invention it is generally desired to use the smallest amount of styrene which will result in the desired control of polymer molecular weight. The products of the preferred methods of this invention contain no more than 2 percent by weight of styrene and generally less than one percent.

Table 1 illustrates the effect of incorporation of styrene, according to this invention, into polyethylene.

TABLE 1

| Polymer No. | Styrene Content, percent wt. | I.V., dl./g. | $M_v$ | Density, g./cc. | Mechanical Properties | | |
|---|---|---|---|---|---|---|---|
| | | | | | Yield Point, p.s.i. | Elongation at Break, percent | Hardness Shore D |
| 1-1 | 0 | 8.19 | 640,000 | 0.934 | 3,050 | 462 | 54 |
| 1-2 | 0 | 2.1 | 100,000 | 0.949 | 3,906 | 1,140 | 57 |
| 1-3 | 0 | 1.1 | 42,000 | 0.960 | 4,300 | 12 | 62 |
| 1-4 | 0.4 | 2.5 | 125,000 | 0.955 | 3,597 | 1,323 | 65 |
| 1-5 | 0.8 | 2.0 | 95,000 | 0.955 | 3,525 | 1,460 | 67 |
| 1-6 | 1.4 | 1.4 | 55,000 | 0.960 | 3,810 | 330 | 65 |
| 1-7 | 1.9 | 1.3 | 52,000 | 0.961 | 3,860 | 80 | 66 |
| 1-8 | 0 | 1.8 | 80,000 | 0.947 | 3,087 | 1,132 | 62 |
| 1-9 | a 1 | | | | 3,043 | 1,297 | 63 |
| 1-10 | a 3 | | | | 3,115 | 1,031 | 62 | a Incorporated by blending general purpose polystyrene with high density polyethylene.

In Table 1, polymer 1–1 was prepared with no molecular weight control additive. Polymers 1–2 and 1–3 were prepared with use of hydrogen for molecular weight control. Polymers 1–4 through 1–7 were prepared using styrene in accordance with this invention. Polymers 1–1 through 1–7 were all prepared with similar catalysts and under similar reaction conditions.

Polymer 1–8 is a commercial polyethylene. Polymers 1–9 and 1–10 were prepared by physically blending commercial crystal grade polystyrene with polymer 1–8, in order to provide a comparison of effects due to blended polystyrene and to polystyrene which is made a part of the polymer chains according to this invention.

The data in Table 1 illustrate the effective reduction in molecular weight obtained according to this invention. The effect of increased density, apparently due to decreased methyl-branching, is also clearly shown both in the density data and in the increased stiffness, increased yield point, and increased hardness.

Example 2

Table 2 illustrates similar effects in ethylene-propylene copolymers of high ethylene content. Such copolymers have very low tensile yield strengths, and in these cases the inclusion of styrene tended to slightly increase the tensile yield point.

TABLE 4

| Intrinic viscosity dl./g.: | Density difference (density of D-density of E), g./cc. |
|---|---|
| 0.5 | 0.0029 |
| 1 | .0031 |
| 2 | .0033 |
| 3 | .0031 |
| 4 | .0025 |
| 5 | .0022 |
| 6 | .0015 |

The density differences, especially in the I.V. range up to 3, 20 confirm the improved crystallinity obtained according to this invention.

TABLE 2

| Polymer No. | Ethylene Content, Percent wt. | Styrene Content, Percent wt. | I.V., dl./g. | $M_v$ | Density, g./cc. | Mechanical Properties | | |
|---|---|---|---|---|---|---|---|---|
| | | | | | | Yield Point, p.s.i. | Elongation at Break, Percent | Hardness Shore D |
| 2-1 | 86.5 | 0 | 3.8 | 440,000 | 0.895 | 420 | 655 | 31 |
| 2-2 | 85.8 | ~0.1 | 2.4 | 240,000 | | 420 | 850 | 27 |
| 2-3 | 87.8 | 0.3 | 2.0 | 160,000 | | 400 | 790 | 27 |
| 2-4 | 88.5 | 0.5 | 1.8 | 95,000 | | 440 | 790 | 29 |
| 2-5 | 88.1 | 0.5 | 1.3 | 57,000 | 0.905 | 430 | 740 | 27 |
| 2-6 | 88.1 | 0.9 | 0.85 | 33,000 | 0.906 | 605 | 490 | 34 |
| 2-7 | 89.6 | 1.8 | 0.50 | 16,000 | 0.917 | 940 | 20 | 40 |

Example 3

Table 3 illustrates the fact that modified polyethylene produced according to this invention has impact resistance similar to that of conventional polyethylene of substantially higher density. In Table 3, the polymers designated by A are produced according to this invention and contain some styrene. Those designated by B and C are commercial polyethylenes, believed to be produced by contacting ethylene with aluminum diethyl chloride-titanium tetrachloride catalyst. The B series have densities of about 0.96 and are believed to be produced with hydrogen for molecular weight control, and the C series have densities somewhat below 0.95 and are believed to be produced without hydrogen addition.

TABLE 3

| Polymer | I.V. | Density | Izod Impact |
|---|---|---|---|
| A-1 | 1.25 | .961 | 0.5 |
| A-2 | 1.4 | .960 | 0.7 |
| A-3 | 2.0 | .950 | 2.7 |
| B-3 | 1.9 | .962 | 3.0 |
| C-3 | 1.8 | .947 | 0.7 |
| A-4 | 2.1 | .952 | 4.9 |
| B-4 | 2.1 | .962 | 5.0 |
| C-4 | 2.2 | .947 | 1.0 |
| A-5 | 2.4 | .950 | 7.8 |
| B-5 | 2.4 | .960 | a 8 |
| C-5 | 2.4 | b .945 | a 1.2 | a Value read from graph.
b By interpolation.

When polymers of similar intrinsic viscosities are compared, e.g., A-3, B-3 and C-3; A-4, B-4 and C-4, and so forth, it is seen that the polymers of this invention show the same rapid increase in impact resistance with I.V. that is typical of commercial polyethylene of much higher density (B). It is thought that this improved impact behavior may be due in part to an improved, relatively narrow molecular weight distribution attained according to this invention.

Example 4

Table 4 shows a comparison of densities of polyethylenes produced under otherwise identical conditions except that the D-series were produced according to this invention and the E-series with use of hydrogen for molecular weight control. The catalyst employed was the reaction product of tri-sec-butyl vanadate and ethyl aluminum sesquihalide.

Example 5

Experimental ethylene polymerization runs according to this invention were carried out as follows:

Method A

Into a dry stirred glass reactor, filled with nitrogen was placed one liter of solvent. Separate solutions were prepared containing, respectively, transition metal compound, aluminum alkyl and styrene, each in sufficient solvent to produce 150 ml. of solution. The reactor was brought to the desired temperature (40° C. unless otherwise stated) by means of a controlled temperature bath, and the ethylene flow into the reactor was begun at a controlled rate of 1000 cc./minute (calculated at STP), unless otherwise indicated. When the solvent had become saturated, simultaneous addition of each of the above-mentioned separate solutions was started at identical, controlled rates, generally 1.3 to 1.5 cc. per minute per liter of reaction mixture. The rates were controlled to maintain exit gas flow at about 65–75% of input flow. The reactions were generally continued for about 2 hours. Thereafter, the remaining catalyst was killed and converted to water-soluble form by addition of 100 ml. of a solution of 600 ml. isopropyl alcohol, 600 ml. water and 100 ml. of concentrated hydrochloric acid, followed by further stirring for a few minutes. Thereafter 900 ml. of distilled water was added, stirring continued for a few more minutes, and the layers settled and separated. The hydrocarbon layer was washed twice more with distilled water, then with 1% $NaHCO_3$ and then again with distilled water.

The polymer was completely coagulated with isopropyl alcohol or acetone, drained free of most solvent, collected and dried in vacuo for at least 3 hours at 80° C.

The recovered polymer was further treated to remove any styrene homopolymer that may have been formed in the reaction. For this purpose, polymer was repeatedly precipitated from tetrachloroethylene until the infrared absorbance ratio of the 700 cm.$^{-1}$/1470 cm.$^{-1}$ bands no longer changed, thus showing a constant styrene concentration in reprecipitated product.

It should be noted that the content of extractable styrene homopolymer in polymer produced according to this invention is generally quite low and often negligible. Extraction of styrene homopolymer is not required in commercial application of the process of this invention.

Method B

A slight modification of Method A was employed in some runs. In the modified runs, styrene was not added as a separate solution, but was dissolved in the aluminum alkyl component of the catalyst. No significant differences in results were observed due to this modification.

The results of a number of runs carried out in this manner are shown in Table 5.

TABLE 5

| Run No. | Method | Ethylene Flow Rate, cc./min. | Styrene Total Amount ml. | Styrene Total Amount mmole | Catalyst Compound | Catalyst Total Amount, mmole | Co-Catalyst Compound | Co-Catalyst Total Amount, mmole | Time, min. | Temperature °C. | Yield, g. | I.V., dl./g. | Styrene in Polymer, Percent wt. | Density, g./cc. |
|---|---|---|---|---|---|---|---|---|---|---|---|---|---|---|
| 5-1 | | 1,000 | 0 | 0 | VO(O-sec Bu)₃ | 0.05 | Al₂Et₃Cl₃ | 3.7 | 55 | 40 | 22.0 | 7.80 | 0 | 0.933 |
| 5-2 | A | 1,000 | 2.5 | 22 | VO(O-sec Bu)₃ | 1.25 | Al₂Et₃Cl₃ | 16.7 | 70 | 40 | 3.4 | 3.3 | Neg. | |
| 5-3 | B | 1,000 | 2.5 | 22 | VO(O-sec Bu)₃ | 1.25 | Al₂Et₃Cl₃ | 16.7 | 130 | 40 | 55.0 | 2.4 | 1.1 | 0.950 |
| 5-4 | B | 1,000 | 2.5 | 22 | VO(O-sec Bu)₃ | 1.25 | Al₂Et₃Cl₃ | 33.4 | 130 | 40 | 39.0 | 2.2 | 0.9 | 0.952 |
| 5-5 | A | 1,000 | 2.5 | 22 | VO(O-sec Bu)₃ | 1.0 | Al₂Et₃Cl₃ | 11.1 | 115 | 40 | 39.3 | 2.0 | 0.8 | 0.955 |
| 5-6 | A | 1,000 | 5.0 | 44 | VO(O-sec Bu)₃ | 1.25 | Al₂Et₃Cl₃ | 11.1 | 110 | 40 | 25.0 | 1.4 | 1.4 | 0.961 |
| 5-7 | A | 1,000 | 25 | 218 | VO(O-sec Bu)₃ | 5.0 | Al₂Et₃Cl₃ | 41.7 | 110 | 40 | 43.5 | 0.9 | 4.3 | 0.907 |
| 5-8 | A | 800 | 11.6 | 101 | VO(O-sec Bu)₃ | 0.75 | Al₂Et₃Cl₃ | 7.8 | 60 | 40 | 6.9 | 0.82 | 1.9 | |
| 5-9 | A | 800 | 17.2 | 150 | VO(O-sec Bu)₃ | 0.5 | Al₂Et₃Cl₃ | 7.8 | 150 | 40 | 6.8 | 1.7 | 1.9 | |
| 5-10 | B | 1,000 | 2.5 | 22 | VO (DIPS) | ~7.0 | Al₂Et₃Cl₃ | 11.1 | 80 | 39 | 8.0 | 3.14 | 0.9 | 0.950 |
| 5-11 | B | 800 | 50.0 | 434 | VO (DIPS) | ~5.8 | Al₂Et₃Cl₃ | 8.34 | 95 | 40 | 4.9 | 0.55 | 6.8 | |
| 5-12 | B | 1,000 | 2.5 | 22 | TiCl₄ | 5.0 | Al₂Et₃Cl₃ | 36.0 | 12.0 | 40 | 7.3 | 0.70 | 0.7 | 0.962 |

EXAMPLE 6

Styrene-modified copolymerizations of ethylene and propylene were run in similar manner to the ethylene polymerization runs of Example 5. Information on these runs is shown in Table 6. In all cases, the run was made at 40° C. in one liter of cyclohexane, with an ethylene flow rate of 600 cc./min. and a propylene flow rate of 250 cc./min., both as gas at STP. Styrene was added as in Method A of Example 5.

TABLE 6

| Run No. | Styrene Total Amount ml. | Styrene Total Amount mmole | Catalyst Compound | Catalyst Total Amount, mmole | Co-Catalyst Compound | Co-Catalyst Total Amount, mmole | Time, min. | Yield, g. | I.V., dl./g. | Styrene in Polymer, percent wt. | C₂⁻ in C₂⁻–C₃⁻ Copolymer Portion, percent mole | Density, percent/cc. |
|---|---|---|---|---|---|---|---|---|---|---|---|---|
| 6-1 | 0 | 0 | VO(O-sec Bu)₃ | 0.25 | Al₂Et₃Cl₃ | 5.6 | 80 | 26.6 | 3.8 | | 86.5 | .895 |
| 6-2 | 0.15 | 1.3 | VO(O-sec Bu)₃ | 0.5 | Al₂Et₃Cl₃ | 5.6 | 135 | 53.0 | 2.2 | 0.1 | 83.6 | |
| 6-3 | 0.4 | 3.5 | VO(O-sec Bu)₃ | 0.5 | Al₂Et₃Cl₃ | 5.6 | 115 | 36.5 | 2.0 | 0.3 | 87.8 | |
| 6-4 | 0.75 | 6.6 | VO(O-sec Bu)₃ | 0.5 | Al₂Et₃Cl₃ | 5.6 | 110 | 29.0 | 1.8 | 0.5 | 88.5 | |
| 6-5 | 1.5 | 13 | VO(O-sec Bu)₃ | 1.0 | Al₂Et₃Cl₃ | 11.1 | 120 | 39.3 | 1.3 | 0.5 | 88.1 | .905 |
| 6-6 | 2.5 | 22 | VO(O-sec Bu)₃ | 1.0 | Al₂Et₃Cl₃ | 11.1 | 115 | 32.0 | 0.85 | 0.9 | 88.1 | .906 |
| 6-7 | 5 | 44 | VO(O-sec Bu)₃ | 1.25 | Al₂Et₃Cl₃ | 11.1 | 130 | 40.3 | 0.49 | 1.6 | 90.1 | .917 |
| 6-8 | 10 | 87 | VO(O-sec Bu)₃ | 2.5 | Al₂Et₃Cl₃ | 22.2 | 115 | 42.9 | 0.50 | 1.8 | 89.6 | .917 |
| 6-9 | 25 | 218 | VO(O-sec Bu)₃ | 5.0 | Al₂Et₃Cl₃ | 41.7 | 115 | 33.2 | 0.25 | 7.0 | 85.9 | |
| 6-10 | 1.5 | 13 | VO(O-iPr)₃ | 1.0 | Al₂Et₃Cl₃ | 11.1 | 170 | 50.0 | 1.5 | 0.6 | 88.0 | |

I claim as my invention:

1. In a process for the production of a modified crystallizable polyalkene of the group consisting of polyethylene and random copolymers of ethylene with from 5 to 60 mol percent of an alpha-monoolefin of from 3 to 18 carbon atoms per molecule by contact of the polymerization feed components in liquid phase with a catalyst from the group consisting of halides of titanium and vanadium, and hydrocarbon-soluble compounds of vanadium, and, as cocatalyst, an organoaluminum compound, the improvement which comprises continually adding said feed components to a liquid reaction mixture containing said catalyst while simultaneously continually adding to said reaction mixture an amount of styrene sufficient to result in a polymerization product containing from 0.01 to 7 weight percent styrene characterized by a lower molecular weight than polyalkene produced under identical conditions except for omission of styrene from the polymerization mixture.

2. In a process for the production of modified polyethylene by contact of ethylene in liquid phase in hydrocarbon diluent with a catalyst from the group consisting of halides of titanium and vanadium, and hydrocarbon-soluble compounds of vanadium, and, as cocatalyst, an organoaluminum compound, the improvement which comprises continually adding ethylene to a liquid reaction mixture containing said catalyst while simultaneously continually adding to said reaction mixture an amount of styrene sufficient to result in a polymerization product containing from 0.1 to 2 weight percent styrene attached as end groups to polyethylene chains and characterized by a lower molecular weight than polyethylene produced under identical conditions except for omission of styrene from the polymerization mixture.

3. In a process for the production of a modified random polyalkylene copolymer of ethylene with from 5 to 20 mol percent of propylene by contact of the polymerization feed components in liquid phase in hydrocarbon diluent with a catalyst from the group consisting of hydrocarbon-soluble compounds of vanadium, and, as cocatalyst, an organoaluminum compound, the improvement which comprises continually adding said feed components to a liquid reaction mixture containing said catalyst while simultaneously continually adding to said reaction mixture an amount of styrene sufficient to result in a polymerization product containing from 0.1 to 2 weight percent styrene attached as end weight than polyalkene produced under identical conditions except for omission of styrene from the polymerization mixture.

4. A process according to claim 3 wherein said diluent is cyclohexane, said catalyst is a trialkyl vanadate VO(OR)₃ wherein R is a branched alkyl group of 3 to 4 carbon atoms, said co-catalyst is an aluminum alkyl sesquichloride, the reaction temperature is in the range from 40° to 60° C., the reaction pressure in the range from 30 to 150 p.s.i.g., the ratio of styrene to vanadium is in the range from 2:1 to 40:1 and the styrene concentration in the reaction mixture in the range from 0.001 to 0.2 molar.

References Cited

UNITED STATES PATENTS 3,117,945   1/1964   Gorham et al. _____ 260—88.2
3,150,121   9/1964   Quarles et al. _____ 260—80.5
3,300,458   1/1967   Manyik et al. _____ 260—88.2

OTHER REFERENCES

Chem. Abs. vol. 60, p. 13414d.

JOSEPH L. SCHOFER, *Primary Examiner.*

L. EDELMAN, *Assistant Examiner.*